(12) United States Patent
Leinonen et al.

(10) Patent No.: US 7,089,033 B2
(45) Date of Patent: Aug. 8, 2006

(54) MOBILE TERMINAL HAVING UWB AND CELLULAR CAPABILITY

(75) Inventors: Marko E Leinonen, Oulu (FI); Kari Moilanen, Oulu (FI); Jukka M Kansanaho, Tyrnävä (FI)

(73) Assignee: Nokia Corporation, Espoo (FI)

( * ) Notice: Subject to any disclaimer, the term of this patent is extended or adjusted under 35 U.S.C. 154(b) by 150 days.

(21) Appl. No.: 10/847,133

(22) Filed: May 17, 2004

(65) Prior Publication Data

US 2005/0255878 A1    Nov. 17, 2005

(51) Int. Cl.
*H04M 1/00*    (2006.01)
(52) U.S. Cl. .............................. 455/553.1; 455/552.1; 455/41.2; 455/509; 455/455; 455/436; 379/93.05; 379/93.07; 375/219; 375/220
(58) Field of Classification Search .............. 455/552.1, 455/553.1, 41.2, 509, 455, 436; 375/219–220; 379/93.05, 93.07
See application file for complete search history.

(56) References Cited

U.S. PATENT DOCUMENTS

| | | | | |
|---|---|---|---|---|
| 5,796,772 | A | * | 8/1998 | Smith et al. ................ 375/130 |
| 6,351,652 | B1 | * | 2/2002 | Finn et al. ................ 455/552.1 |
| 6,389,059 | B1 | | 5/2002 | Smith et al. ................ 375/141 |
| 6,694,150 | B1 | * | 2/2004 | Standke et al. .......... 455/552.1 |
| 6,725,058 | B1 | * | 4/2004 | Rinne et al. ............. 455/553.1 |
| 6,801,755 | B1 | * | 10/2004 | Kardach et al. ............ 455/41.2 |
| 6,952,594 | B1 | * | 10/2005 | Hendin .................... 455/552.1 |
| 2004/0162106 | A1 | * | 8/2004 | Monroe et al. .......... 455/552.1 |
| 2004/0224719 | A1 | * | 11/2004 | Nounin et al. ........... 455/553.1 |
| 2005/0111346 | A1 | * | 5/2005 | Santhoff et al. ............ 370/203 |
| 2005/0164642 | A1 | * | 7/2005 | Roberts .................... 455/67.13 |

FOREIGN PATENT DOCUMENTS

EP    1389855 A2    2/2004

OTHER PUBLICATIONS

"Multispectral Solutions, Inc.—History of UWB Technology", Robert Fontana, http://www.multispectral.com/history.html, Dec. 29, 2003, 10 pages.
"Recent Advances In Ultra Wideband Communications Systems", Robert Fontana, et al., IEEE Conference on Ultra Wideband Systems and Technologies, May 2002, 6 pages.
"Commercialization Of An Ultra Wideband Precision Asset Location System", Robert Fontana, et al., IEEE Conference on Ultra Wideband Systems and Technologies, Nov. 2003, 6 pages.
"On the UWB System Coexistence With GSM900, UMTS/WCDMA, and GPS", Matti Hamalain, et al., IEEE Journal On Selected Areas In Communications, vol. 20, No. 9, Dec. 2002, pp. 1712-1721.

* cited by examiner

*Primary Examiner*—George Eng
*Assistant Examiner*—Sharad Rampuria
(74) *Attorney, Agent, or Firm*—Harrington & Smith, LLP

(57) ABSTRACT

A transceiver capable of handling both UWB and narrowband calls includes a mechanism for detecting when a signal from one of the narrowband systems will interfere the UWB communication and switching the UWB data connection link to the alternative data path.

46 Claims, 9 Drawing Sheets

MOBILE TERMINAL HAVING UWB AND CELLULAR CAPABILITY

TECHNICAL FIELD

The field of the invention is wireless communications using mobile handsets, in particular systems that have the capability of communicating with both UWB technology and also with GSM or other cellular communication technology.

BACKGROUND OF THE INVENTION

Ultra wide band UWB communication systems refer to communication systems where the radio spectrum of the communication system is spread over a very wide frequency range compared to communication data speed. The technology is approaching commercial application, with various governments specifying permitted frequency ranges for the technology. The IEEE, specification body is in the process of establishing the standard IEEE 802.15.3. There are currently two proposals for the standard: one based on pulse radio technology and one based on OFDM (Orthogonal Frequency Division Method). The purpose of the UWB communication system standard is to increase the data throughput rate much higher than current wireless local area network (WLAN) data rates. The WLAN is standardized in the IEEE 802.11 and different versions of it.

Pulse radio ultra Wide Band (UWB) communications systems employ signals that are simply a very short pulse of RF frequency; a technology that has been explored since its origins in the 1960's.

Referring to FIG. 1A, there is shown a simplified sketch of a prior art transceiver. In the past, the classical transceiver contains a reference oscillator (synth) 34 which, as a rule, is stabilized with some reference crystal element 32 (Ref Osc). During reception, this frequency is subtracted from the received signal, and during transmission it is added to the data transferred (in up-down converter 20). Element 20 includes a channel filter which selects the operational RF channel. The RF signals pass through RF switch 15 to and from antenna 10. The RF switch 15 selects whether the transmission path or receiver path is connected to antenna 10. Band pass filter 12 filters out unwanted signals outside of the spectrum band of the system. The input and output signals are amplified by amplifiers 17 and 18.

Element 20 may include multiple down conversion, which is not shown in the figure in order to make figure simple. The filtered down converted RF signal is amplified with IF filters or baseband filters. The amplified signal is demodulated with module 35. Example 1A shows demodulation for an analog signal. The demodulation module 35 may include an analog-to-digital (AD) converter. Demodulation can be done also with digital signal processing (DSP). The information from demodulation circuitry is fed to baseband unit 50 that processes the detected information. In the case of digital data, the bits are converted to and from standard pulse levels and sent to or received from the relevant source or receiving units.

For UWB, the transmitter can be relatively simple compared with a narrow-band (NB) transmitter—the transmitter forms a pulse of a required shape and sends it to the antenna. FIG. 1B shows a pulse generator 42 connecting directly to RF switch 15. In case of reception, we amplify the signal in the same amplifier 17 as the narrow-band transceiver. The next module includes matched filter and correlator circuitry. The matched filter is optimally designed for the transmitted signal so that it optimizes the signal-to-noise ratio of the received signal. The correlator circuitry performs the detection of the received signal. The detected received signal is fed to baseband processor, denoted generally with numeral 50, which e.g. shows a received video signal to the display.

It is technically more difficult to detect a single pulse than a series of oscillations of the carrier frequency. Extensive work has been done in developing appropriate hardware, which is not a limit to the practical application of the invention described herein.

It is an advantageous feature of the invention that the UWB hardware is much simpler than NB transceivers and can be entirely assembled on a chip. An important advantage is that a UWB transmitter needs no analog part—a signal can be sent to the air right from the chip, and in case of reception this analog part is much simpler and can be realized within the frames of not only hybrid technologies but also base ones, i.e. CMOS and the like.

FIG. 2 illustrates graphs comparing the behavior of an UWB signal and a conventional narrow-band signal. On the upper left of the Figure, graph 220 shows a series of pulses, nominally one half cycle of an RF frequency, with a positive signal taken to represent a logic one and a negative signal representing a logic zero. On the lower left, a corresponding graph 210 shows a frequency shift as the distinguishing element, with a lower frequency compared with a nominal reference indicating a logic zero and a higher frequency indicating a logic one. A requirement for such a system is that the time duration of each bit is long enough that the receiver can reliably distinguish the logic states.

On the upper right, the frequency spectrum corresponding to the time signal is shown. Curve 225 shows a broad band covering the range from 3 GHz to 10 GHz (hence the name "ultra-wideband"). Typically, this very wide operational band is divided into smaller RF channels; having a channel bandwidth of around 528 MHz.

On the lower right, the time domain signal in graph 215 is confined within a relatively narrow band. In current communication systems: GSM bandwidth (BW) 273 kHz, IS-95 (=American CDMA) BW 1.25 MHz, WCDMA BW 3.84 MHz, WLAN 11 MHz. In the claims, the term "narrowband" will refer to a width of the communication system spectrum of the order of 10 MHz.

FIG. 3 shows a portion of the spectrum near the UWB band (3.1 GHz to 10.6 GHz). Bar 322 indicates the GPS band at 1.6 GHz, bar 324 indicates the PCS band at 1.9 GHz and bar 326 indicates the lower WLAN band (802.11b) at 2.4 GHz. There are several other systems working in the same 2.4 GHz band such as Bluetooth and cordless phones. Those skilled in the art will appreciate that harmonics of the foregoing bands will fall within the UWB range.

Further, the upper band for WLANs (band 802.11a) falls within the UWB range, denoted by bar 328. The frequency range is from 5.15 GHz up to 5.725 GHz.

Curve 310, representing UWB radiation, is shown as having a magnitude below the "Part 15 Limit", referring to FCC regulation CFR-47 part 15. The UWB signal is required to be less than −41 dBm/MHz (a strength indicated by dotted line 330) in the specified signal range. There is not a formal requirement of signal strength below 3.1 GHz, but workers in the field assume that a limit of −61 dBm/MH is appropriate, in view of the sensitivity of GPS receivers to interference.

In the commercial marketplace, UWB applications include:

High Speed (20+ Mb/s) LAN/WANs

Altimeter/Obstacle Avoidance Radars (commercial aviation)

Collision Avoidance Sensors

Tags (Intelligent Transportation Systems, Electronic Signs, Smart Appliances)

Intrusion Detection Radars

Precision Geolocation Systems

Industrial RF Monitoring Systems

The second alternative UWB standard proposal is based on OFDM, which is shown in the FIG. 9. The UWB proposal based on OFDM has been proposed by the multiband OFDM consortium (http://www.multibandofdm.org/). The OFDM technology is well established, having been invented more than 40 years ago. OFDM has been adopted by several standards: Asymmetric Digital Subscriber Line (ADSL) services, VDSL, Digital Audio Broadcast (DAB), Digital Terrestrial Television Broadcast: DVB in Europe and ISDB in Japan. The WLAN standards IEEE 802.11a/g, 802.16a are based on OFDM.

Because OFDM is suitable for high data-rate systems, it is also currently being considered for the following standards: Fourth generation (4G) wireless services and IEEE 802.11n and IEEE 802.20.

The OFDM is a sub carrier modulation in which the original data has been divided into several smaller data streams. In the proposed UWB specification the 528 MHz radio channel is divided to 128 sub-carriers.

The same radiation power specifications apply to both UWB standard proposals.

Since frequency approval for UWB operation has yet to be acted upon by the Federal Communications Commission (FCC), there are currently no "approved" applications within the United States.

SUMMARY OF THE INVENTION

The invention relates to a handset for a mobile wireless telecommunications system that has the capability of operating with UWB technology and at least one type of cellular communications (narrowband RF) technology.

A feature of the invention is a subsystem for switching a communications link from one technology to another, for example from UWB to WCDMA or to GSM or to WLAN or to CDMA.

Another feature of the invention is the automatic switching of a communications link from UWB to the next fastest available technology.

Another feature of the invention is that when UWB and a cellular connection are used at the same time, and cellular operation is not completely blocking the UWB receiver, the UWB connection quality (=connection speed) can be improved by changing the UWB channel to another one that is not affected by harmonics of the other operating systems.

BEST MODE OF CARRYING OUT THE INVENTION

In general, when an UWB system is specified as part of a larger system, the primary consideration on interference has been that the UWB system does not interfere with other systems; but it has not been studied how other systems will interfere with UWB in combined terminals.

In an UWB receiver, the first band filter after the antenna will filter out frequencies that are below 3.1 GHz and above 10.6 GHz; and thus the fundamental frequencies of the GSM and WCDMA can be suppressed. In addition, a WLAN can be suppressed, but the suppression level is lower than the foregoing, since there is a transition band of about 600 MHz from the lowest UWB frequency to the highest 2.4 GHz WLAN frequency.

A WLAN operating at 5 GHz is within the frequency band of the UWB, so that those two systems cannot operate at the same time within the same apparatus, since the transmitted WLAN signal will saturate the UWB amplifier completely.

When harmonics from the upper band of the GSM or WCDMA are generated in the UWB band in a given apparatus, the actual power levels are much higher than the received UWB signal levels from exterior sources. This high level unwanted signal will corrupt the UWB signal and the UWB throughput is lowered or completely stopped.

Figure 4:
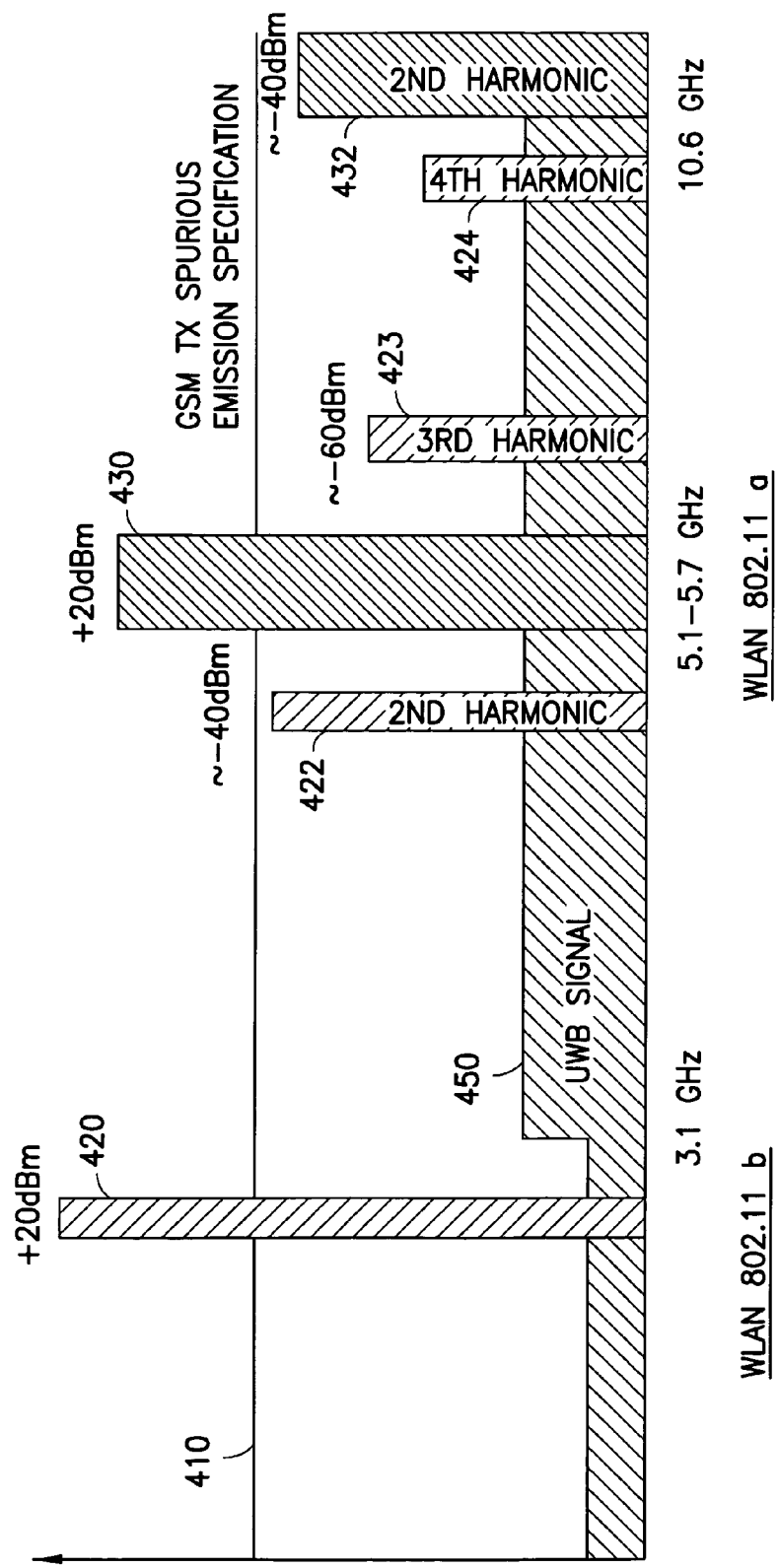
FIG. 4 illustrates various signal levels in an UWB antenna input when a WLAN is integrated into the same device.

FIG. 4 illustrates an example of signals in the 802-11b band (2.4 GHz) and 802-11a band (5.1 GHz) from a WLAN in the same device of conventional construction. On the left, bar 420 indicates the strength in the electronics of the transceiver, of the 802.11b signal (+20 dBm), with bars 422, 423 and 424 indicating corresponding 2nd, 3rd and 4th harmonics at −20 dBm, −60 dBm and −80 dBm, respectively. The mentioned levels of the signals are representative only. Bar 430 at +20 dBm is the strength of the 802.11a band at 5.1–5.7 GHz, with a 2nd harmonic 432 at 10.2–11.4 GHz. It is evident that the presence within the same device of a generator for radiation at these frequencies will saturate the input circuits of the UWB channel. For comparison, line 410 shows the limit set by the relevant specification for spurious emissions from GSM transmissions. It is evident that a GSM transmission will also saturate the UWB channel.

Figure 5:
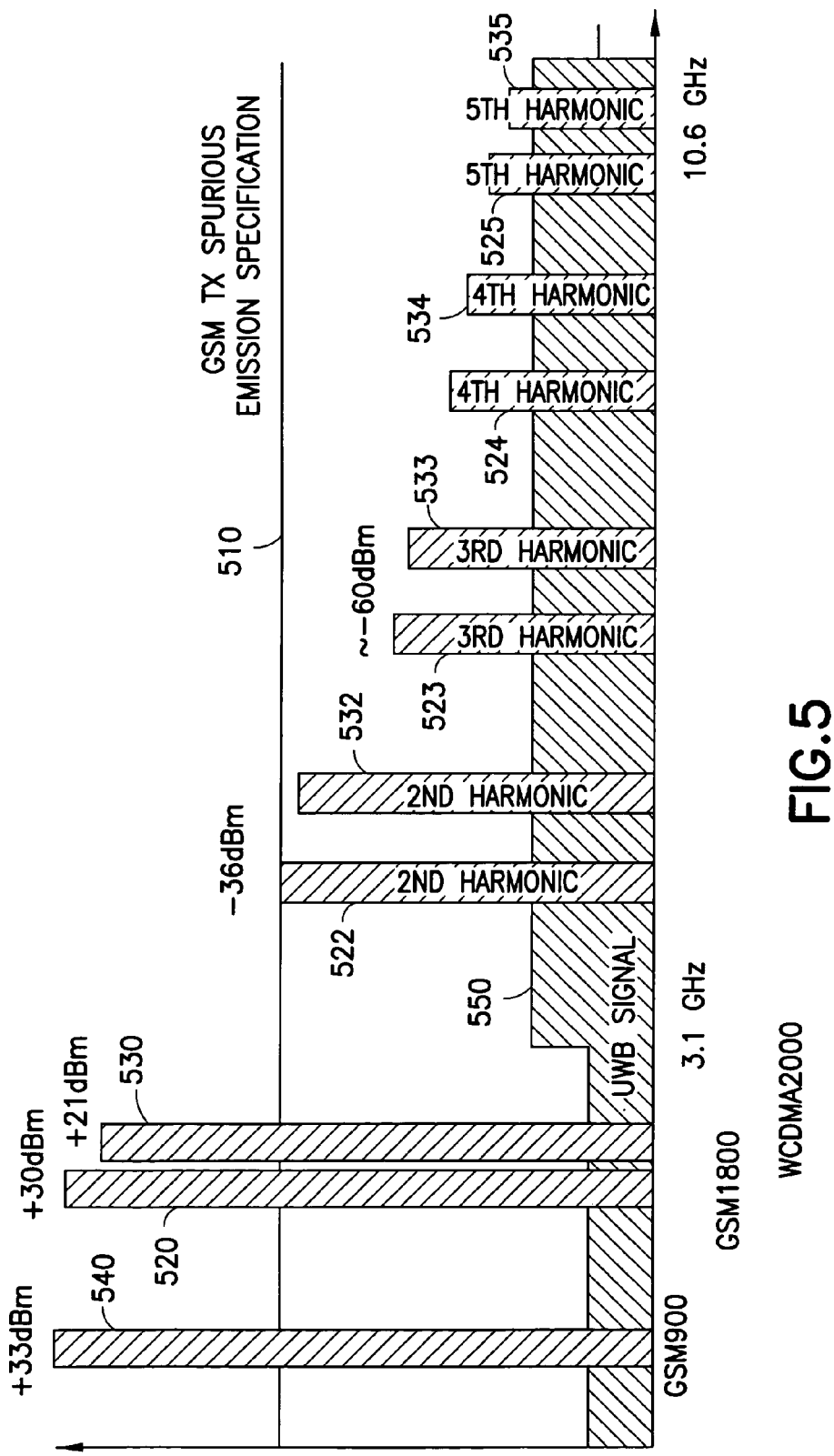
FIG. 5 illustrates various signal levels in an UWB antenna input when a GSM or WCDMA is integrated into the same device.

FIG. 5 is similar to FIG. 4, showing the signal levels when a GSM system or a WCDMA system is integrated into the same device. Bars 540, 520 and 530 show the nominal strength of the fundamental signals of GSM900, GSM1800 and WCDMA2000, respectively, at +33 dBm, +30 dBm and +21 dBm, respectively. The nominal level of the UWB signal (line 550) and the GSM spurious emission permitted by the specification (line 510) are also shown.

Second harmonics, (522 and 532), third harmonics (523, 533) fourth harmonics (524, 534) and even fifth harmonics (525, 535) all fit into the UWB band.

In addition, the GSM900 channel will have fifth and higher harmonics within the UWB band, which are omitted from the Figure.

The solution, according to the invention, to the interference problem is to make use of the aspect of the system that caused it and to transfer the UWB data out of the UWB band to the fastest system available that is non-UWB or to use an UWB channel which is not affected by the second communication system. The preferred solution is that UWB communication is maintained. This can be done by using only certain UWB channels, which are not affected by the other communication system. If the UWB link (or path) is not working even after the UWB link is changed to an unaffected UWB channel, then the UWB communication is transferred to a non-UWB communication link. The term "link" is used generally herein to indicate the path that data takes through the various systems; i.e. one speaks of an UWB link meaning a path for data through an UWB channel or a GSM link meaning a path for data through a GSM channel.

For example, when there is present in a communications-system a WLAN and an UWB, the initiation of a WLAN signal that saturates and blocks the UWB data causes the UWB data to be shifted over to another channel in the WLAN.

Figure 6:
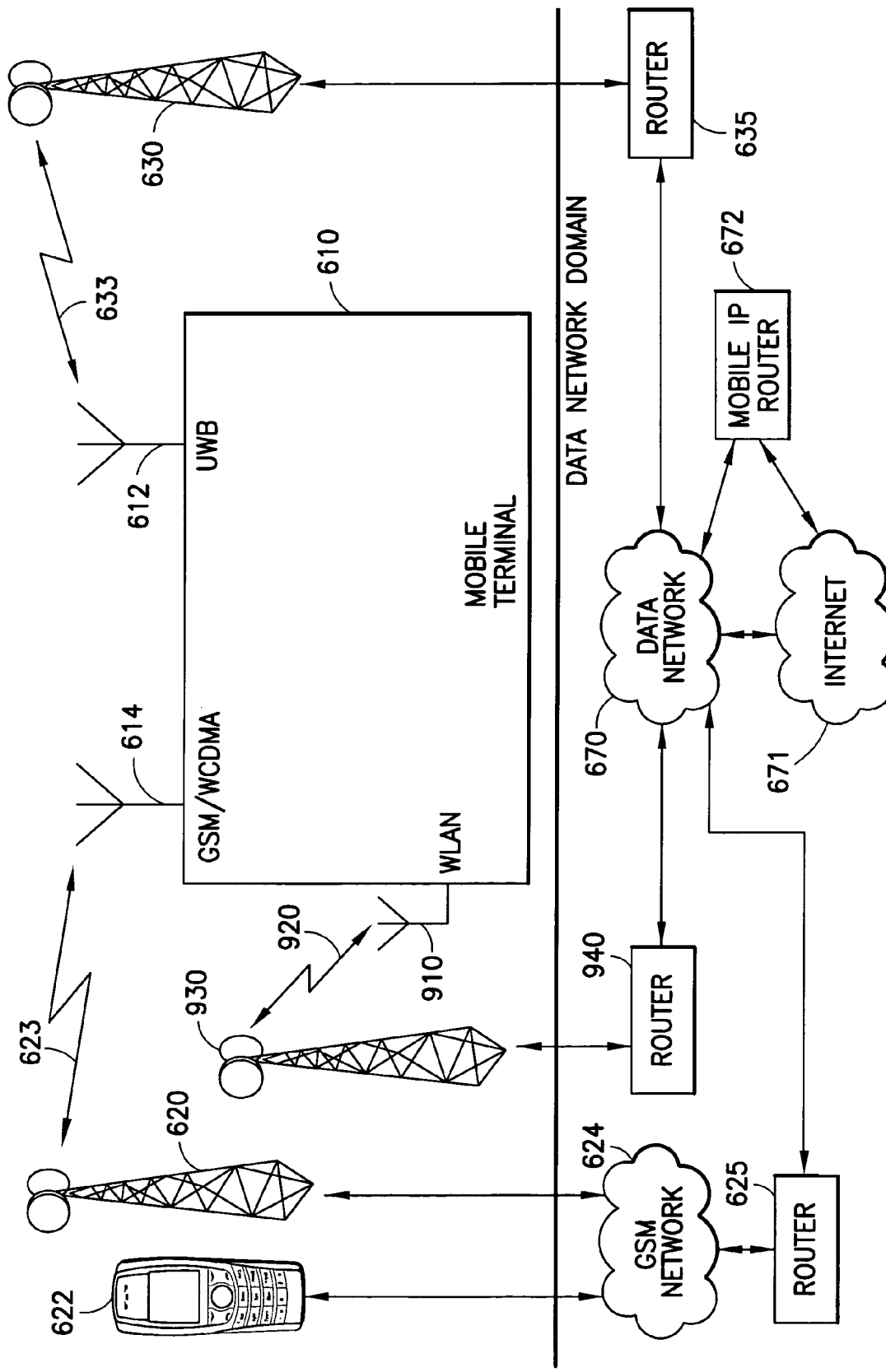
FIG. 6 indicates a system where a mobile station is connected to an UWB base station.

FIG. 6 presents an example where the UWB link is to connect the mobile terminal via an UWB link to the data network. This figure illustrates a system configuration representing a possible situation, in which a terminal 610 transmits operating data over an UWB link to UWB base station transmitter/antenna 630 that sends the data through channel 633 to antenna 612. When the UWB link is active, the user may want to make call to his/her friend. In this case a GSM voice call is established. The GSM call can be made by a signal passing from GSM antenna 614 to GSM base station 620 via GSM channel 623. The GSM call is routed from GSM base station 620 to GSM network 624. The GSM network routes the GSM call to another user mobile phone marked with numeral 622.

As discussed above, when the voice link is active, the signal strength of one or more of the interfering signal harmonics will prevent or disturb the UWB link from operating.

According to the invention, the data that would have flowed through the UWB channel (referred to for convenience as UWB data regardless of the channel followed) are sent along an alternate route, if the interference situation at the channel in use makes UWB communication too slow compared to other available data transmission channel speeds. If the UWB data cannot be transmitted via another UWB channel, then the UWB data can be re-routed via data networks to which the UWB base station is connected. Illustratively, the alternate route is from transmitter 630 through any convenient transmission medium to router 635, operating according to the Internet Protocol (IP) then through the data network 670, through a second router 625 to the GSM network and then to transmitter 620, from which it passes through an air interface 623 as a GSM or CDMA signal to antenna 614. Another alternative route for UWB data re-routing is to route UWB data from antenna 630 via router 635 to the data network and from there to another router 940 where the data is routed to WLAN base station 930 via WLAN link 920 to antenna 910 in the mobile terminal 610.

The data network 670 can be any type of data network designed for data transmission. This network 670 can be an Internet network marked with numeral 671. The UWB data is converted to suitable format in the router blocks for the network type.

In a preferred embodiment, the alternate path is an Intranet, so that the transmission of data is held up as little as possible by passing through one or more interfaces between different vendors.

The designer of a system using the invention will preferably arrange the timing of data and/or provide for buffer storage so that the processes associated with the switch to the alternate channel and back will not cause any data to be lost.

Whichever of many available system configurations is selected, the result, according to the invention, is that the UWB data continue to flow, though at a reduced rate, along an alternative link when the cellular channel is active.

When the IP connection is first established an IP address is generated for the connection, if a permanent IP address is available to be used. This IP address generation can be done for all air-interfaces individually if needed. This IP address specifies the point where data from the data source is transmitted.

When the UWB link quality decreases below a threshold value, then the terminal requests an alternative radio link for the purpose of re-routing. If the UWB data connection is done over IP data protocol as shown in FIG. 6, then the alternative IP connection may have the same logical IP address, even though both individual connections may have their own physical IP addresses. Substituting or masking the physical IP addresses can be done in the network element mobile IP router 672.

Since different air-interfaces have different set-up times different thresholds are needed to allow time for the required handshaking to make an IP connection available when needed, When an individual threshold value for the UWB link quality is passed, the set-up process is started so that an alternative link is available for data re-routing when it is required.

In a normal GSM connection, the data is routed via a circuit switched data connection. The data speed of a normal GSM call is 9600 baud. There is an improved GSM data connection called Circuit Switched data (CSD) where the data speed is 14.4 kbit. There is a still faster GSM data transmission method available called high-speed circuit switched data (HSCSD) that can improve the data connection speed up to 57.6 kbit (HSCSD).

In GSM systems there is also a defined dedicated data access method called GPRS (General Packet Radio Service) that makes it possible for a terminal to have an always on Internet connection. There is also a new enhanced GPRS specified in the GSM standards. This E-GPRS or EDGE can triple the data connection speed compared to a normal GPRS connection. There are several data speed classes specified to GPRS and E-GPRS standards. The speed of these modes is still higher, but the particular value will depend on the available transmission and reception slots. The GPRS data speed can be up to 170 kbit when E-GPRS data speed can be up to 384 kbit.

Bluetooth is a short-range radio connectivity standard, which is widely used in mobile phones. This technology can be used to transfer data between terminals and mobile enhancements can be wirelessly connected to mobile terminals. The maximum data through put rate of the Bluetooth is about 1 Megabit per second.

The data speed of the WCDMA system begins from the 12.2 kbit up to 2 Mbit, which is the theoretical maximum speed. The normal user average data speed will be around 400 kbit.

If there is only one alternate link, then the UWB data will have to flow along that channel. If more than one link is available, the preferred order is that of fastest throughput: WLAN, Bluetooth connectivity, WCDMA, E-GPRS, GPRS or GSM. The preferred order of the systems may differ if some of the communication systems are free of charge and the others incur costs. Preferably, the user has menu control to override the system default method when the signal quality is unsatisfactory.

A GSM call coming into the terminal 610 is taken as an example. When the GSM call is initiated from the terminal 622 then the first data packets are received in terminal 610. If at the same time UWB link 633 is active, then an interference free UWB channel is needed. The UWB link is moved to an UWB channel free of cellular harmonic interference, since the GSM part of the terminal knows where in the frequency domain the harmonics will be generated. The UWB link is switched to clear channels and the quality of the UWB link is monitored during the GSM or WCDMA transmission. If the monitoring result falls below a certain predefined level e.g. the bit error rate is higher than an acceptable quality of service level, then an alternative route for the UWB data is needed.

If the UWB is based on OFDM modulation then the GSM or cellular harmonic will not destroy UWB communication channel completely. The harmonic will harm data on one or more sub-carriers. As a limit, the sub-carrier data throughput may be decreased due to harmonic interference. A processor on the cellular side of the mobile terminal can calculate which UWB sub-carriers are impacted, the UWB side can then more carefully study the data streams of those carriers. Even though some sub-carriers are completely blocked most of the data can be transmitted without errors on the rest of the sub-carriers. This ability to continue with fewer sub-carriers is an advantage of OFDM modulation.

The decision to switch the UWB data link away from the UWB frequency is a trade-off between the usable alternative data connection speeds and the amount of the transmitted/received data (=the size of the transmission file).

Another example is that terminal 610 will initiate a GSM call. If at the same time UWB link 633 is active, then an interference free UWB channel is needed. The UWB link is moved to an UWB channel free of harmonic interference, since the GSM part of the terminal knows where in the frequency domain the spurious signals will be generated. The UWB link is switched to a clear channel and the quality of the UWB link is monitored during the GSM or WCDMA transmission. If the monitoring result falls below a certain predefined level e.g. the bit error rate is higher than an acceptable quality of service level, then an alternative route for UWB data is needed. If the trade-off between the data amount and the expected UWB connection time is shorter than a predefined time, then the GSM call is postponed until the UWB connection is finished.

The alternative path is preferably a predefined non-interfering UWB channel and if the communication is not working with the predefined unaffected UWB channels then the data are transferred to an alternative GSM or WCDMA channel (passing through associated modules that format the data from the UWB standard to the appropriate format for GSM or CDMA as the case may be). At the receiving end, the recording or displaying units will be directed to receive data from the alternate channel.

If the UWB link 633 signal quality or the UWB data rate under interference condition from the cellular connection is better than available alternative data routes, then the UWB link is maintained.

Suitable handshake sequence(s) take place and the UWB data then flow through the alternate route. The data rate on the alternate route, if the alternative route is not an UWB link at the other (non-interfering) UWB frequency, will be less than through the UWB channel. The data speed of the reception and transmission will be adjusted to the lower rate.

Figure 1A:
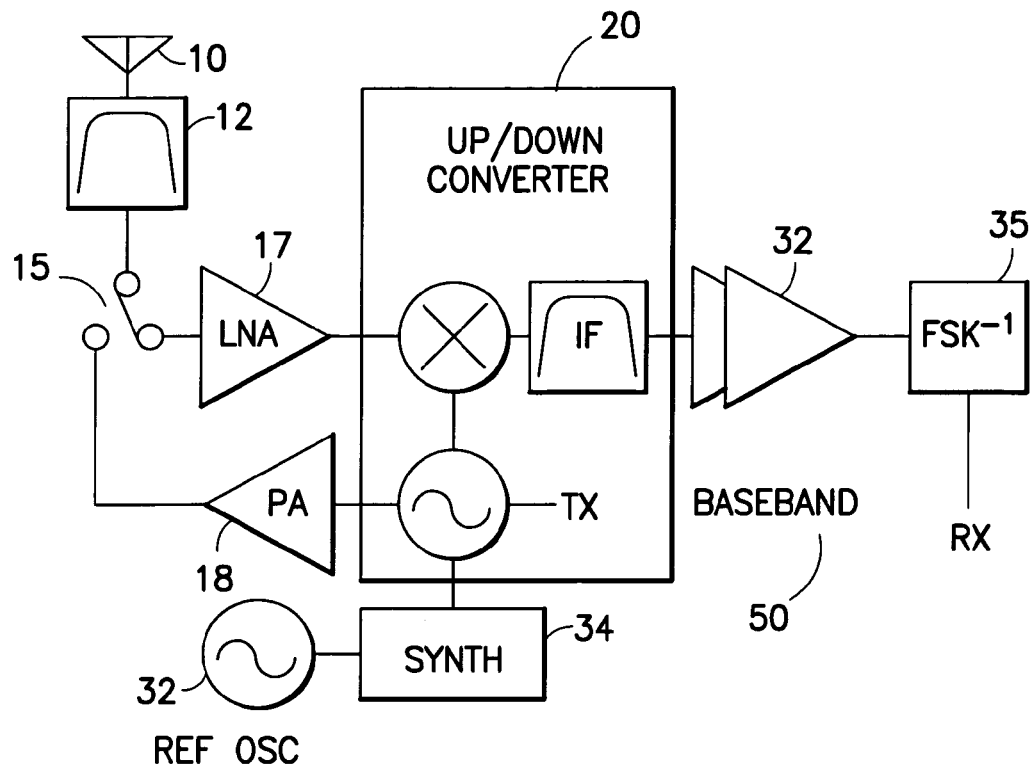
FIGS. 1A and 1B illustrate simplified views of a conventional superheterodyne transmitter and an UWB transmitter, respectively.
Figure 1B:
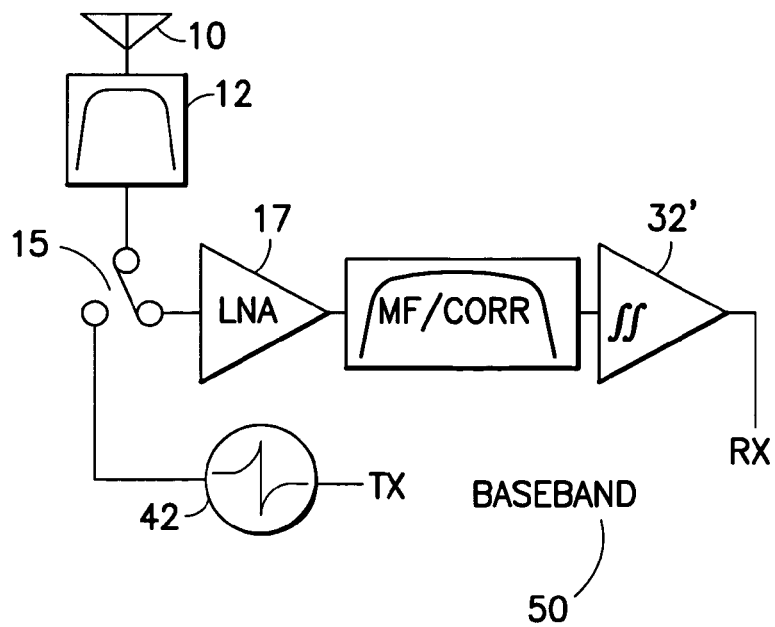
Figure 2:
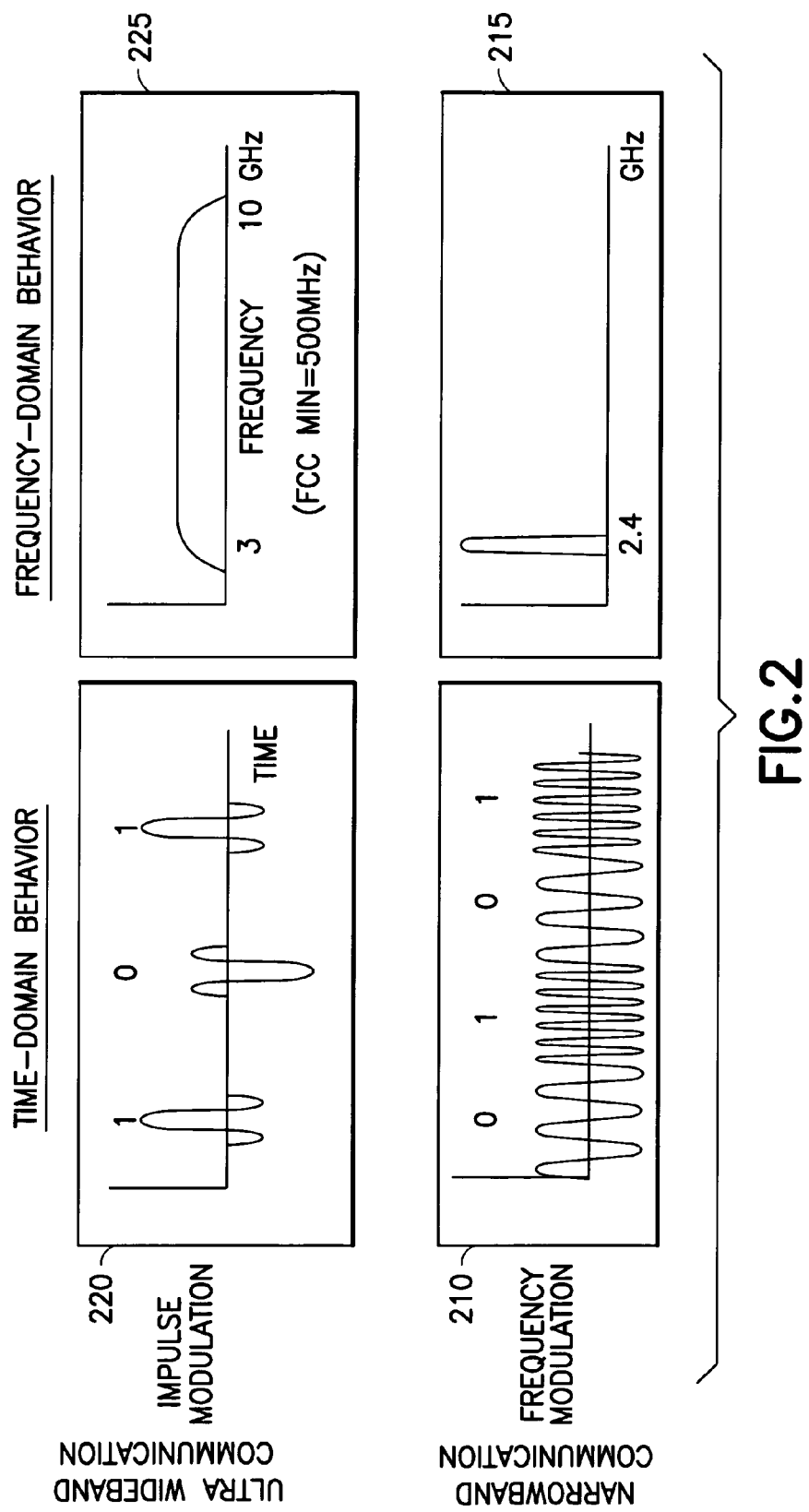
FIG. 2 illustrates time and frequency domain behavior of traditional narrowband and UWB technologies.
Figure 3:
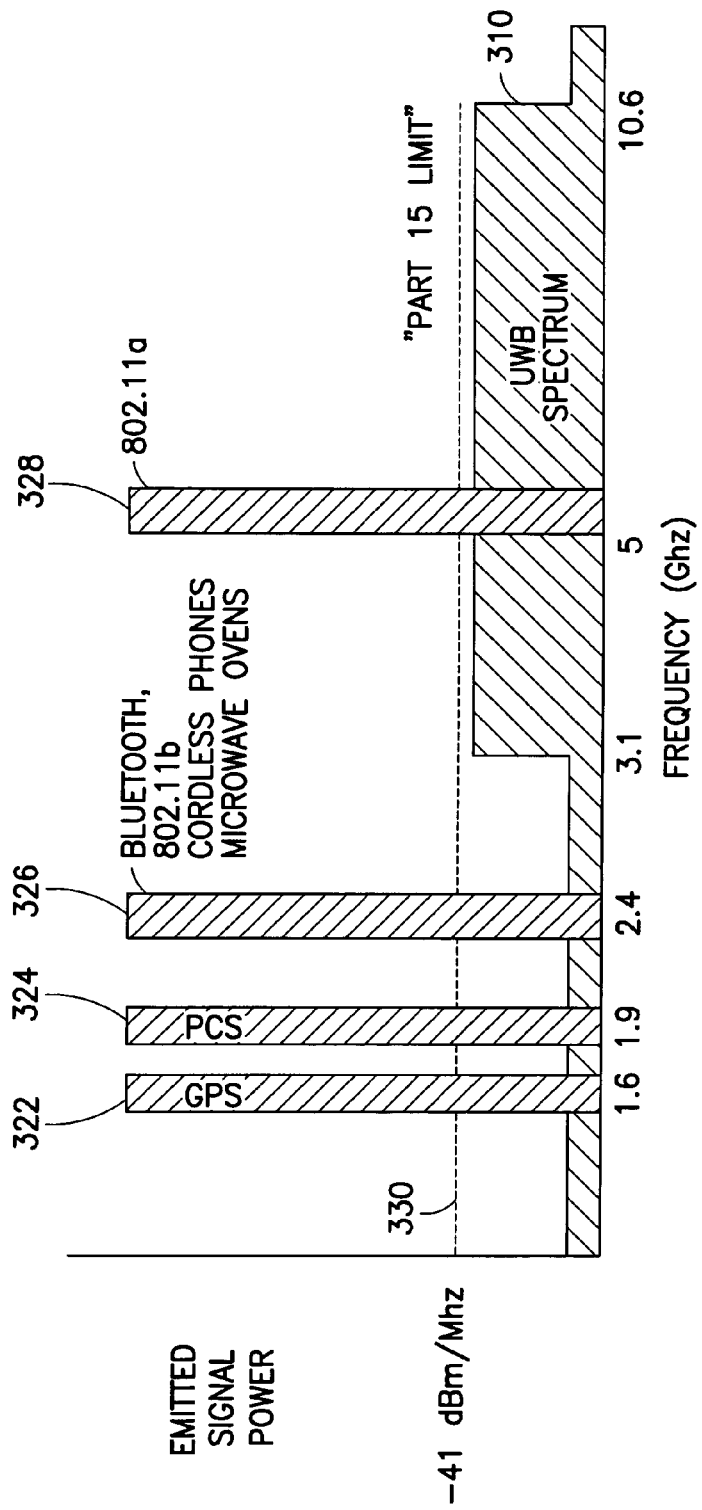
FIG. 3 illustrates a simplified view of the interference in frequency of various technologies.
Figure 7:
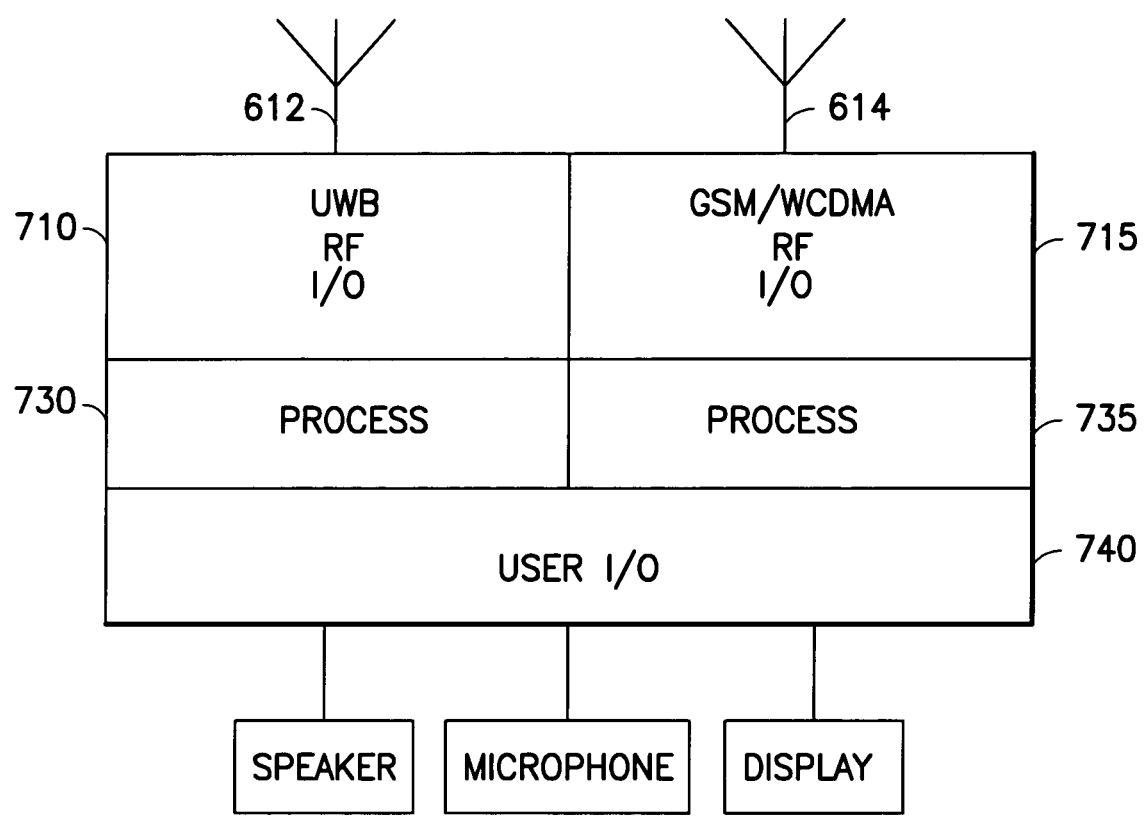
FIG. 7 indicates a configuration of a transceiver for use with the invention.

FIG. 7 shows a simplified block diagram of a system that includes two channels for use according to the invention. On the left side, antenna 612 is an UWB antenna similar to antenna 612 in FIG. 6. Block 710 represents the RF section (RF unit) of a transceiver, as shown in FIG. 1B.

Block 730 represents a data processing unit and includes many possible functions. The transmitted and received data processing is done in this block. The processing may include the audio coding/encoding, channel coding/encoding, CDMA related data spreading, etc. Block 740 acts as a user interface, which converts user related input e.g., user voice to digital format for transmission purposes and converts received digital data to analog output format e.g. the voice of the person.

The conventional electronic modules and/or software represented by blocks 730 and 735 perform appropriate manipulation of the incoming data as required to transmit the data along the channel (GSM, WCDMA, etc.). Blocks 730 and 735 also perform the appropriate operations on incoming data to format the data (including voice) for the interface units. The blocks 730 and 735 can be implemented as one module or processor chip. The data connection shift between UWB and narrowband is done by interaction by 730 and 735.

Those skilled in the art will appreciate that the functions of block 730 or 735 may be carried out by a suitably programmed general purpose computer and/or by specialized signal processing integrated circuits.

In particular, processor 730 will detect (or respond to a signal) that a GSM or WCDMA call is about to begin and will transfer the UWB data to the appropriate alternative channel.

When the cellular call is over, the system will preferably revert to the previous state, with the UWB data travelling through the UWB channel.

At the bottom of FIG. 7, box 740 represents data interface connections to I/O, such as a speaker, microphone display and associated I/O circuitry.

Figure 8:
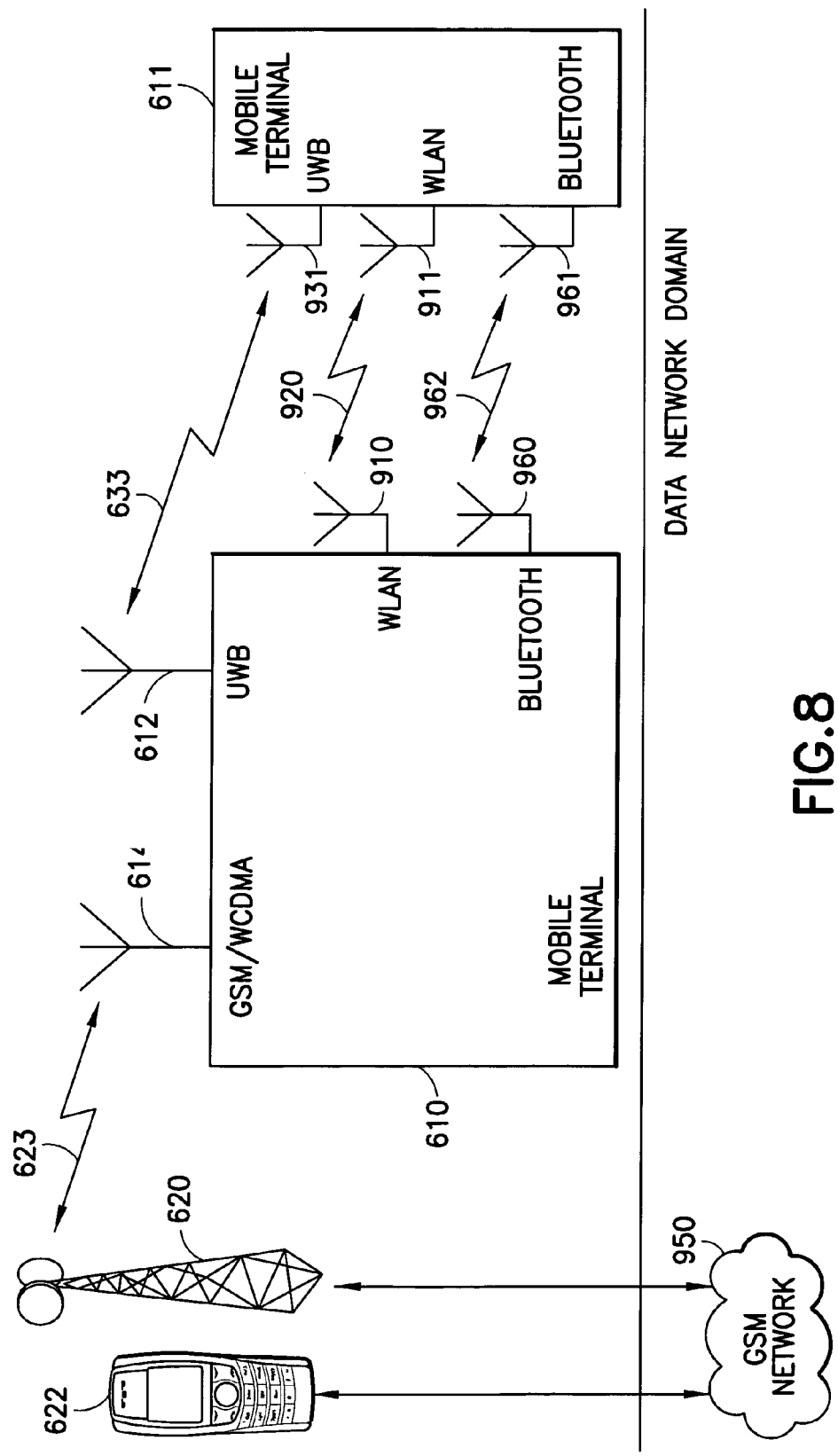
FIG. 8 indicates a system where a mobile station is connected to another UWB terminal FIG. 9 indicates an UWB spectrum based on OFDM
Figure 9:
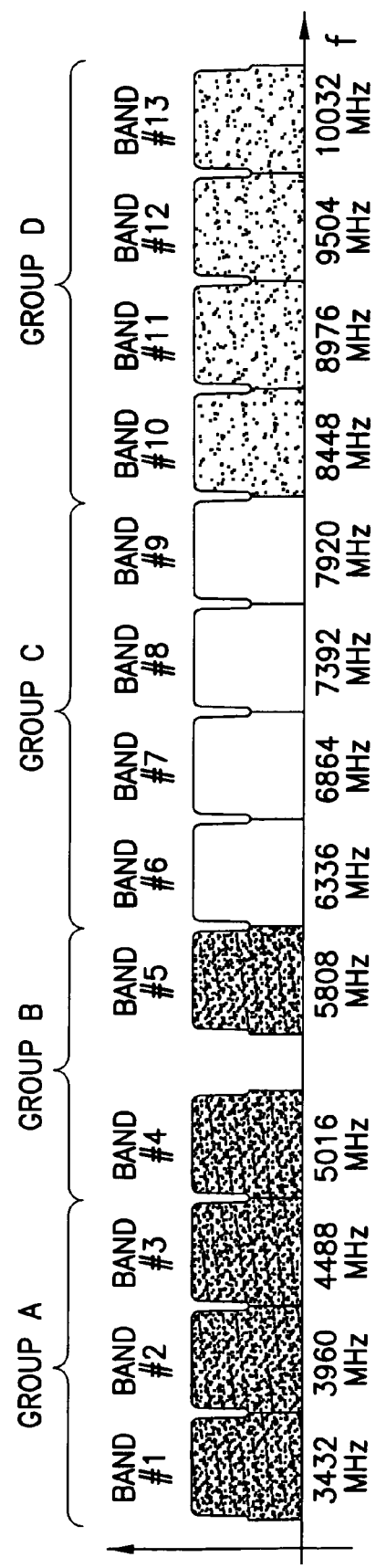

On the right side of the Figure, blocks 715, and 735 are counterparts to blocks 710, and 730, respectively. Block 715 corresponds to the RF section of FIG. 1A. Block 735 performs the various coding, frequency spreading, encryption, etc. appropriate for that type of narrowband communications FIG. 8 illustrates a scenario where the UWB air interface is used as a wireless communication channel between two mobile terminals. If the mobile terminal 610 makes a GSM call when the UWB link 633 is active, then the UWB link quality may be affected. If the amount of the data to be transferred between terminals is small or the expected time when the UWB link will be on is short, then the GSM call is postponed until the UWB data is transmitted. If a GSM call affects the UWB link quality, an alternative route is needed. The most preferable situation is to change to an UWB RF channel that is not affected by GSM harmonics. If this does not help the UWB connection, then another air-interface can be used. FIG. 8 shows another mobile terminal 611, which supports UWB between antennas 612 and 931, WLAN on link 920 between antennas 910 and 911 and Bluetooth connectivity on link 962 between antennas 960 and 961. When the UWB link needs to be changed to another air interface, the first choice is a WLAN, since it is the fastest link. If establishing a WLAN link is not successful then a Bluetooth link can be tried.

In a typical sequence of steps according to the invention, two UWB terminals are initially connected to each other and at least one has also GSM cellular phone capability. The UWB link 633 is established or will be established between mobile terminals 610 and 611. The user of 610 wants to make a normal GSM call to his/her friend during the UWB data connection or there is an incoming call from mobile phone 622 to terminal 610.

If at the same time UWB link 633 is active, then an interference free UWB RF channel is needed in order to maintain good quality reception and data speed. The UWB link is shifted to a clear UWB channel, since the GSM part of the terminal knows where in the frequency domain the interference will be generated. The quality of the UWB link is monitored during the GSM transmission. If the monitoring result fall below a predefined threshold level e.g. the bit error rate is higher than an acceptable quality of service level then an alternative route for UWB data is needed. If the trade-off between the data amount and the expected UWB connection time is shorter than predefined time, then the GSM call is postponed until the UWB connection is finished.

The UWB link quality can be measured using various methods. The first method is by observing the bit error rate, block-error rate, packet error rate or any other error rate. These measures measure the link quality comparing the coming data bits to known data bits e.g. the pilot bits or data bits or the known data blocks.

There are alternative link quality measures such as the signal strengths. The measures can be e.g. a signal-to-noise ratio, signal-to-interference ratio or carrier-to-interference ratio. The signal-to-noise ratio measures how much stronger the UWB signal is compared to the noise or an interference signal level. This comparison can be done to the analog or digital signals. If OFDM modulation is used then the signal can refer either to the total RF channel signal or to one of the sub-carrier signal strengths.

The UWB link quality can be measured with the absolute power level of the UWB signal or the absolute power noise or interference signal levels.

Another possible UWB link quality level indicator can be the data through-put rate. This data throughput rate can be measured at different places in the OSI signal model. The OSI signal model defines seven levels of the communication system data. The data thorough put rate can be measured at the physical signal or bit level (L0 or L1 level) or at the signalling level (L2 or L3 level). The data throughput rate can be measured in OFDM modulation case also at the sub-carrier level or at the complete radio channel level.

If the signal quality of the UWB link 633 or the UWB data rate even with interference from the cellular connection is better than available alternative data routes, then the UWB link is maintained.

If the UWB link quality is so poor that re-routing of the UWB data is needed, then mobile terminals can connect to each other by using other local proximity radio interfaces e.g. Bluetooth and WLAN. One of the devices is a master unit, which makes the decision for data re-routing. The designation of which of the devices will be the master unit way be made by any convenient method.

The first alternative rerouting method is to change to an interference free UWB radio channel. The system will go through a "handshaking" or setup sequence, in which it first switches the UWB data to an UWB radio channel When an UWB link is established, part of the process will be that the alternative UWB channel table is agreed upon, including which will be used and in which order if the UWB transmission/reception quality is reduced below a predefined level.

If UWB communication is not working or the data connection speed or the quality of the data with these unaffected channels is less than a predefined acceptance level, then the system moves on in this sequence. The acceptance level is a function of the usable alternative radio communication route data speeds, the amount of the transmitted/received data and the expected time of UWB link operation.

If the trade-off between the data amount and the expected UWB connection time is shorter than a predefined time, then the GSM call is postponed until the UWB connection is finished. If the UWB connection will be on for a relatively long time and the UWB link is affected by the GSM transmission so much that the UWB link is slower than the alternate route, then the UWB data are re-routed.

If the UWB link 633 signal quality or the UWB data rate under the interference from the cellular connection is better than available alternative data routes, then the UWB link is maintained.

If there is no suitable UWB RF channel which works properly, then an alternative air-interface connection is needed. When an UWB link is established other air-interface capabilities of the devices are also evaluated, including their connection speed. The set up sequence includes a priority list, which is used in case the data have to be shifted from the UWB. The priority list of other air-interfaces includes the system related initialisation information; e.g. the radio channel to be used and which terminal is a master terminal. Also, the timing interval for alternative system scanning and connection set up starting time needs to be agreed in the set up.

The UWB data connection is transferred to an alternative air-interface link, when the link is open between the terminals and thus UWB data flow can be maintained. The data speed of the reception and transmission will be adjusted to the lower rate.

If during the GSM connection the RF channel of the GSM call is changed and the UWB link is moved to an alternative air-interface, then a new trial of the UWB band connection is preferable. This increases the data communication speed between terminals.

If the GSM call is finished and the UWB link is moved to an alternative air-interface link, then re-establishment of the UWB connection is preferred in order to maximise data connection speed.

If the UWB connection from the terminal is to the UWB base station 630 for a fast Internet connection, then there will be a slight difference with the previously discussed sequence. FIG. 6 shows that terminal 610 is connected to the Internet via UWB base station 630, router 635 and data network 670. The Internet 671 can be functionally included with the data network 670. The mobile terminal 610 owns an Internet protocol address, which can be used as a target address of the Internet data. Internet connection is basically a logical connection between two Internet addresses: target and source address.

If the terminal 610 notices that the UWB link is not working properly during the GSM operation then the previously mentioned sequence for finding a new UWB channel is used. If there is no properly working UWB RF channel available, then terminal 610 can monitor if alternative air-interfaces are available e.g. a WLAN base station. The terminal 610 can establish the alternative Internet connection via WLAN base station 930 (FIG. 6) and router 940 to the data network 670 and to the Internet 671. When connections to the same IP address via both UWB and WLAN connection are established, then the UWB connection can be dropped, if terminal 610 wants to do this. The reason can be to save the battery for other purposes in addition to improving signal quality.

If, during the GSM connection, the RF channel of the GSM call is changed and the UWB link is moved to an alternative air-interface, then a new trial of the UWB band connection is preferable. This may increase the data communication speed between terminals if a higher speed alternative becomes available.

When the GSM call is finished and the UWB link has been moved to an alternative air-interface link, then re-establishment of the UWB connection is preferred in order to maximise data connection speed.

These radio interference conditions may include situations when the UWB link level. The previous material describes alternative route sequences for UWB links that can be done under other radio interference situations. I is weakened due to movement of the mobile terminals or when the interference is caused by electrical devices other than two UWB link devices.

Those skilled in the art will be aware that the invention described above may be implemented in many forms. An UWB section of a system may be combined with a GSM and/or a CDMA/WCDMA system.

The invention may be implemented in hardware and/or software in various combinations, with functions represented by blocks in the Figures being performed by hard-wired integrated circuits or by software in general purpose circuits (signal processors or general purpose computers) as is convenient.

The term link is used generally to represent a connection from the remote unit to the base recording unit (or vice versa) for both UWB and narrowband, whether the data being transmitted over the link represent voice or other types of data.

The abbreviation CDMA mentioned in previous text can refer to CDMA (Code Division Multiple Access) as a general communication access technology as well as Cdma-One or CDMA2000 cellular communication systems.

The term UWB mentioned in the text refers to ultra wide band communication. The actual modulation method to make UWB communication can be done by either pulse radio or OFDM methods.

Although the invention has been described with respect to a limited number of embodiments, those skilled in the art will appreciate that other embodiments may be constructed within the spirit and scope of the following claims.

We claim:

1. A system for transmitting and receiving data over a wireless interface, the system comprising:
    an ultra wide band (UWB) transceiver for transmitting and receiving radio frequency (RF) radiation along a path through an original channel in an UWB band;
    at least one narrowband transceiver for transmitting and receiving RF radiation in at least one RF band having potential to cause interference with at least a portion of the original channel; and
    data shifting means for shifting UWB data from said original channel to an alternative path when UWB link quality of the original channel decreases below a threshold value, the alternative path predetermined to be less affected than the original channel to interference caused by operation of the at least one narrowband transceiver.

2. A system according to claim 1, in which said alternative path comprises an alternative channel in said UWB band.

3. A system according to claim 1, in which said at least one narrowband transceiver includes at least one of a wireless local area network (WLAN) transceiver, a Bluetooth transceiver, and a cellular phone transceiver; and said data shifting means shifts the UWB data from the UWB band to a fastest alternative channel supported by said at least one transceiver.

4. A system according to claim 1, in which said at least one narrowband transceiver includes at least one of a wireless local area network (WLAN) transceiver, a Bluetooth transceiver, and a cellular phone transceiver; and said data shifting means shifts the UWB data from the UWB band to a lowest cost alternative channel supported by said at least one transceiver.

5. A system according to claim 1, in which said at least one narrowband transceiver includes at least two of a wireless local area network (WLAN) transceiver, a Bluetooth transceiver and a cellular phone transceiver; and said data shifting means shifts the UWB data from the UWB band to one of the at least two transceivers based on a priority list of the at least two transceivers.

6. A system according to claim 5, where the priority list is made based on at least one of a data connection speed or an expected price for a customer.

7. A system according to claim 1, in which said at least one narrowband transceiver includes a wireless local area network (WLAN) transceiver; and said data shifting means shifts the UWB data from the UWB band to a channel supported by said WLAN.

8. A system according to claim 1, in which said at least one narrowband transceiver includes a Bluetooth transceiver; and
    said data shifting means shifts the UWB data from the UWB band to a channel supported by said Bluetooth transceiver.

9. A system according to claim 1, in which said at least one narrowband transceiver includes a Global System for Mobile communications (GSM) cellular phone transceiver; and said data shifting means shifts the UWB data from the UWB band to a channel supported by said GSM cellular phone transceiver.

10. A system according to claim 1, in which said at least one narrowband transceiver includes at least one of a code division multiple access (CDMA) cellular phone transceiver and a wide-band CDMA (WCDMA) cellular phone transceiver; and
    said data shifting means shifts the UWB data from the UWB band to a channel supported by the at least one cellular phone transceiver.

11. A system according to claim 1, in which said data shifting means receives UWB input data signals and in response to the presence of a first narrowband link used by the at least one narrowband transceiver, formats said UWB input data signals for transmission over said first narrowband link.

12. A system according to claim 1, further comprising a data processing unit monitoring the UWB link quality by using one of a bit-error rate, block-error rate, packet error rate or any other error rate.

13. A system according to claim 1, further comprising a data processing unit monitoring the UWB link quality by using one of a signal-to-noise ratio, signal-to-interference ratio or carrier-to-interference ratio.

14. A system according to claim 1, further comprising a data processing unit monitoring the UWB link quality by using an absolute power level of at least one of noise and an interference signal.

15. A system according to claim 1, further comprising a data processing unit monitoring the UWB link quality by using an absolute power level of an UWB signal in the original channel.

16. A system according to claim 1, further comprising a data processing unit monitoring the UWB link quality by using a data throughput rate.

17. A system according to claim 1, further comprising a data processing unit detecting which at least one of a radio channel and frequencies the at least one narrow band transceiver is using and identifying interference free UWB channels there from for alternative path usage.

18. A system according to claim 1, in which interference at the original channel is caused by an electrical device other than devices of the UWB link.

19. A system according to claim 1, in which the data shifting means routes the UWB data to an alternative wireless communication link via a wired data network.

20. A system according to claim 1, in which the data shifting means routes the UWB data to an alternative wireless communication link in an internet protocol (IP) data format.

21. A system according to claim 1, in which there is another threshold value, and which the data shifting means uses the other threshold value to trigger when to start data route handshaking for setting-up the alternative path.

22. A system as in claim 1, in which the system is a mobile terminal.

23. A method for transmitting and receiving data over a wireless interface, the method comprising:
    passing ultra wide band (UWB) data through a path through an original channel in an UWB band;
    communicating RF radiation in at least one RF band having potential to cause interference with at least a portion of the original channel;
    shifting said UWB data from said original channel to an alternative path when UWB link quality of the original channel is less than a threshold value, the path predetermined to be less affected than the original channel to the interference caused by the communication in the at least one RF band; and
    communicating said UWB data through the alternative path.

24. A method according to claim 23, in which said alternative path comprises an alternative channel in said UWB band.

25. A method according to claim 23, in which communicating said USB data further comprises communicating said UWB data through a narrowband link and wherein the method further comprises:
    shifting said UWB data back to said original channel in the UWB band after said narrowband link has terminated.

26. A method according to claim 23, in which communicating said UWB data further comprises communicating said UWB data through a narrowband link and in which said narrowband link passes through a wireless local area network (WLAN).

27. A method according to claim 23, in which communicating said UWB data further comprises communicating said UWB data through a narrowband link and in which said narrowband link passes through a Global System for Mobile communications (GSM) wireless communications system.

28. A method according to claim 23, in which communicating said UWB data further comprises communicating said UWB data through a narrowband link and in which said narrowband link passes through at least one of a code division multiple access (CDMA) or a wide-band CDMA (WCDMA) wireless communications system.

29. A method according to claim 23, in which communicating said UWB data further comprises communicating said UWB data through a narrowband link and in which said narrowband link passes through a Bluetooth wireless communications system.

30. An article of manufacture comprising a program storage medium readable by a computer, the medium embodying instructions executable by the computer for performing the operations of:
    passing ultra wide band (UWB) data through a path through an original channel in a UWB band;
    communicating RF radiation in at least one RF band having potential to cause interference with at least a portion of the original channel;
    shifting the UWB data from the original channel to an alternative path when UWB link quality of the original channel is less than a threshold value, the path predetermined to be less affected than the original channel to the interference caused by the communication in the at least one RF band; and
    communicating the UWB data through the alternative path.

31. An article of manufacture according to claim 30, in which the alternative path comprises an alternative channel in the UWB band.

32. An article of manufacture according to claim 30, in which communicating said UWB data further comprises communicating the UWB data through a narrowband link and wherein the operations further comprise:
    shifting the UWB data back to the original channel of the UWB band after the narrowband link has terminated.

33. An article of manufacture according to claim 30, in which communicating said UWB data further comprises communicating the UWB data through a narrowband link and in which the narrowband link passes through a wireless local area network (WLAN).

34. An article of manufacture according to claim 30, in which communicating said UWB data further comprises communicating the UWB data through a narrowband link and in which the narrowband link passes through a Global System for Mobile communications (GSM) wireless communications system.

35. An article of manufacture according to claim 30, in which communicating said UWB data further comprises communicating the UWB data through a narrowband link and in which the narrowband link passes through at least one of a code division multiple access (CDMA) or a wide-band CDMA (WCDMA) wireless communications system.

36. An article of manufacture according to claim 30, in which communicating said UWB data further comprises communicating the UWB data through a narrowband link and in which the narrowband link passes through a Bluetooth wireless communications system.

37. An apparatus comprising:
    means for passing ultra wide band (UWB) data through a path through an original channel in a UWB band;
    means for communicating RF radiation in at least one RF band having potential to cause interference with at least a portion of the original channel;

means for shifting the UWB data from the original channel to an alternative path when UWB link quality of the original channel is less than a threshold value, the path predetermined to be less affected than the original channel to the interference caused by the communication in the at least one RF band; and means for communicating the UWB data through the alternative path.

38. An apparatus as in claim 37, in which the alternative path comprises an alternative channel in the UWB band.

39. An apparatus as in claim 37, in which the means for communicating said UWB data further comprises means for communicating the UWB data through at least one narrowband link comprising at least one of a code division multiple access (CDMA) link, a wide-band CDMA (WCDMA) link, a wireless local area network (WLAN) link, a Global System for Mobile communications (GSM) link, and a Bluetooth link.

40. A device for transmitting and receiving data over a wireless interface, the device comprising:

an ultra wide band (UWB) transceiver adapted to communicate radio frequency (RF) radiation in at least one of a plurality of UWB bands, the at least one channel comprising an original path, the at least one UWB band carrying UWB data;

at least one narrowband transceiver adapted to communicate RF radiation in at least one RF band, the at least one narrowband transceiver known to cause interference with the at least one UWB band when the at least one narrowband transceiver performs at least one communication operation of transmitting and receiving; and at least one data processing unit adapted to determine that the at least one communication operation is occurring and in response to the occurrence of the at least one communication operation is adapted to shift the UWB data to an alternative path.

41. A device as in claim 40, in which at least one UWB bands comprises a set of the plurality of UWB bands, the set modulated using orthogonal frequency division multiplexing (OFDM) modulation, each of the set comprising a sub-carrier of the OFDM modulation, the at least one narrowband transceiver known to cause interference with first sub-carriers in the set during the at least one communication operation, and in which the at least one data processing unit is adapted to shift the UWB data from the first sub-carriers in the set to second sub-carriers in the set.

42. A device as in claim 40, in which the device is a mobile terminal.

43. A device as in claim 40, in which the at least one narrowband transceiver comprises at least one of a Global System for Mobile communications (GSM) cellular phone transceiver, a Wide-band Code Division Multiple Access (WCDMA) transceiver, and a Wireless Local Area Network (WLAN) transceiver.

44. A device as in claim 43, in which the at least one data processing unit is further adapted to shift the UWB data to at least one channel supported by the at least one transceiver.

45. A device as in claim 43, further comprising at least one second transceiver comprising at least one of a Bluetooth transceiver, a General Packet Radio Service Transceiver, an Enhanced-GPRS transceiver (E-GPRS) transceiver, and in which the at least one data processing unit is further adapted to shift the UWB data to at least one channel supported by at least one of the at least one transceiver and the at least one second transceiver.

46. A device according to claim 40, in which said alternative path comprises an alternative UWB band in said plurality of UWB bands.

* * * * *